United States Patent [19]

Buller-Colthurst

[11] Patent Number: 4,717,572

[45] Date of Patent: * Jan. 5, 1988

[54] MULTI-CONVEYOR PROCESSING SYSTEM

[75] Inventor: Guy E. Buller-Colthurst, Erin, Canada

[73] Assignee: Knud Simonsen Industries Ltd., Rexdale, Calif.X

[*] Notice: The portion of the term of this patent subsequent to Sep. 9, 2003 has been disclaimed.

[21] Appl. No.: 874,127

[22] Filed: Jun. 13, 1986

Related U.S. Application Data

[63] Continuation-in-part of Ser. No. 618,424, Jun. 7, 1984, Pat. No. 4,610,886.

[51] Int. Cl.⁴ .................... G01N 33/02; A23B 4/04; B65G 23/38
[52] U.S. Cl. .................... 426/233; 99/468; 99/474; 99/443 C; 426/315; 426/506; 426/523
[58] Field of Search ............ 426/233, 315, 523, 506; 99/468, 470, 474, 477, 404, 386, 443 C; 17/44.4; 137/563; 198/570, 575, 859; 34/216, 217

[56] References Cited

U.S. PATENT DOCUMENTS

| | | | |
|---|---|---|---|
| 1,581,519 | 4/1926 | Robertson | 426/315 |
| 1,960,516 | 5/1934 | Taylor | 426/315 |
| 3,718,082 | 2/1973 | Lipoma | 99/470 |
| 3,744,617 | 7/1973 | Herbener | 198/859 |
| 3,792,508 | 2/1974 | Simonsen et al. | 17/44.4 |
| 3,982,300 | 9/1976 | Soikie et al. | 17/44.4 |
| 4,250,917 | 2/1981 | Jespersen et al. | 137/563 |
| 4,310,020 | 1/1982 | Jespersen et al. | 137/563 |
| 4,366,177 | 12/1982 | Wells et al. | 426/523 |
| 4,389,562 | 6/1983 | Chaudoir | 34/216 |
| 4,444,094 | 4/1984 | Baker et al. | 99/443 |
| 4,610,886 | 9/1986 | Buller-Colthurst | 426/233 |

FOREIGN PATENT DOCUMENTS 257355  9/1926  United Kingdom ............ 99/443 C

Primary Examiner—George Yeung
Attorney, Agent, or Firm—George A. Rolston

[57] ABSTRACT

A processing system for processing batches of different products in the same process conditions, and having chamber means having zones, processing conditions means for each zone, to procure uniform process conditions within each zone, including water treatment means in at least one zone, first and second separate side by side conveyors passing through the chamber, batch supports maovable on respective first and second conveyors, for carrying batches of products, conveyor movement means for moving said separate batch supports at different timings, to procure different transit and dwell times of different products within the same zones of the chamber, and, control means connected to the conveyor, and a method of processing products in such a system.

15 Claims, 6 Drawing Figures

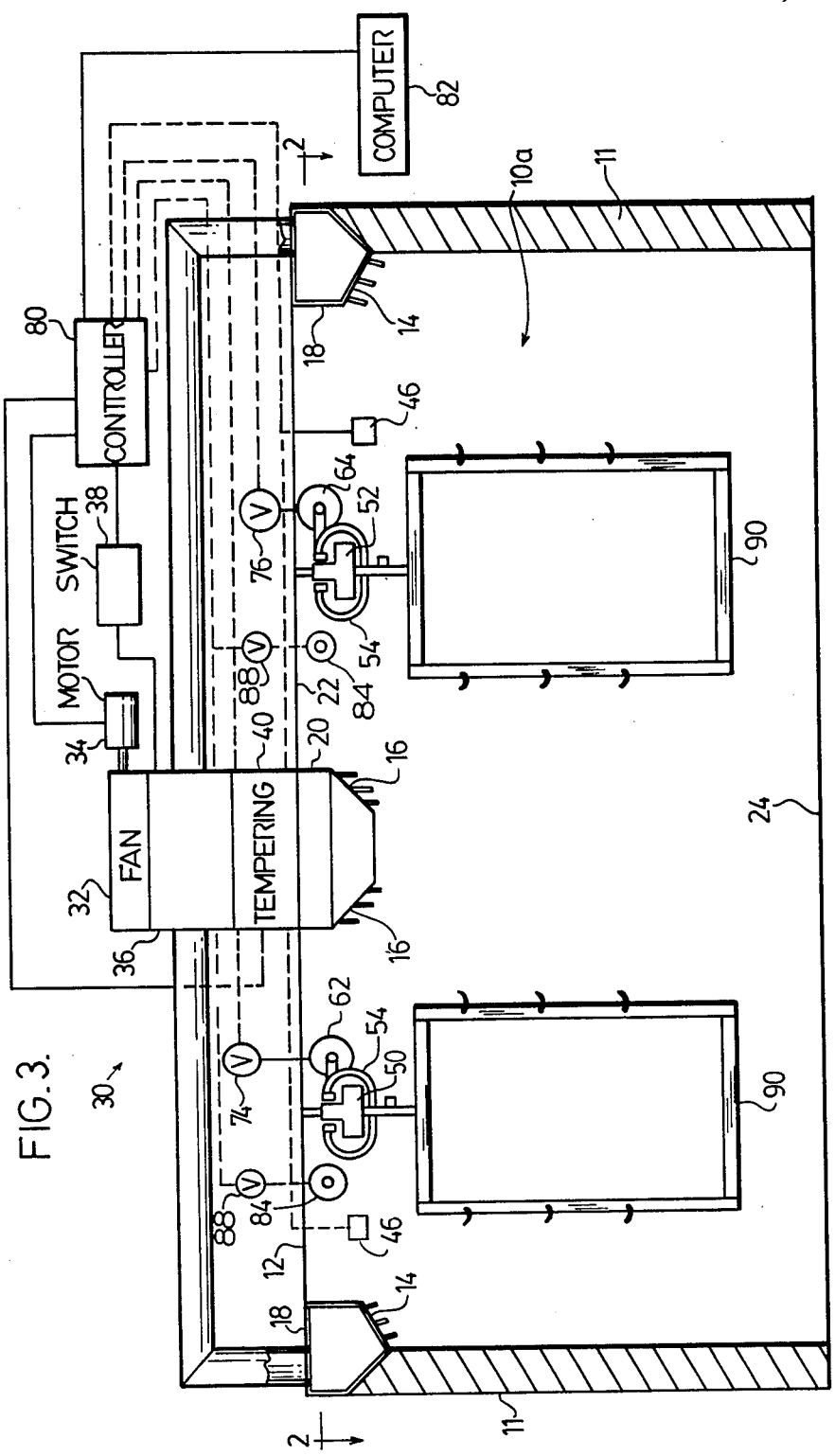

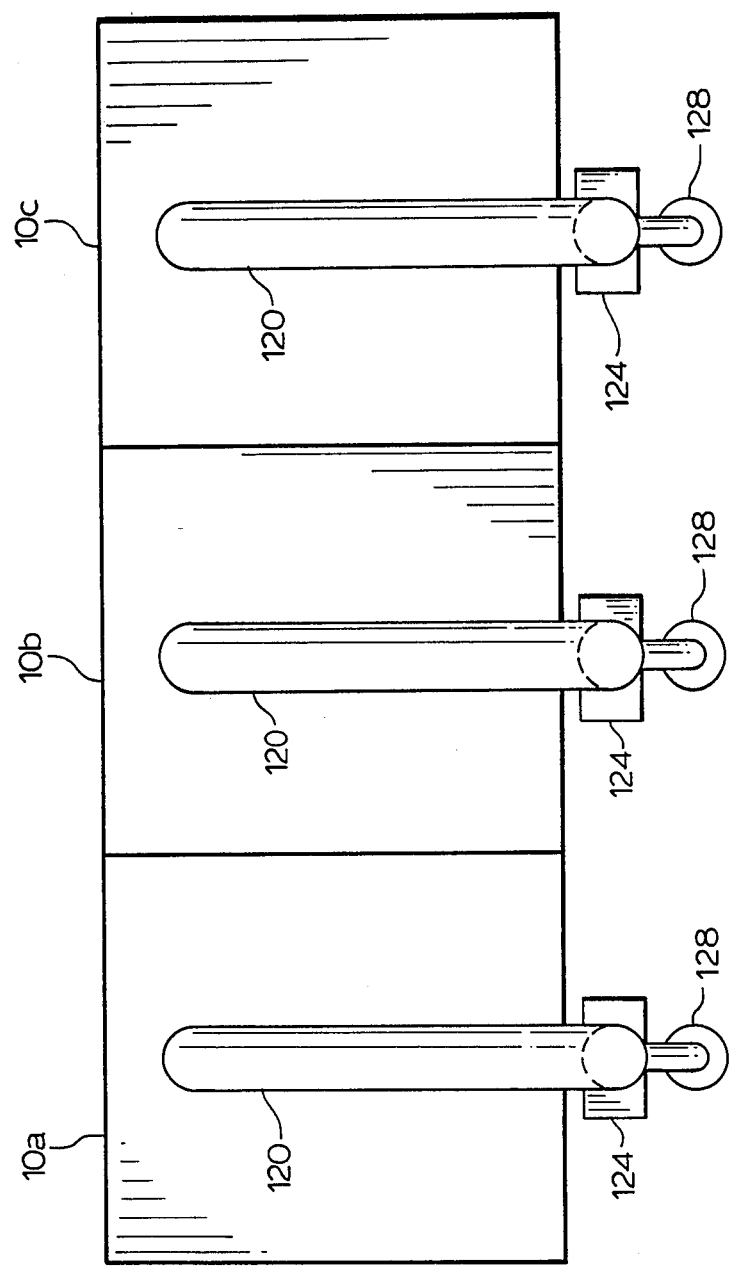

MULTI-CONVEYOR PROCESSING SYSTEM

This application is a continuation-in-part of application Ser. No. 618,424 filed June 7, 1984, now U.S. Pat. No. 4,610,886.

The invention relates to the simultaneous processing of different products, requiring different processing times, in the same processing facility, such as by heating, chilling and the like, and to apparatus therefor.

BACKGROUND OF THE INVENTION

Processing of products, such as by smoking, cooking, chilling, heating, curing, hardening, tempering, or the like is commonly carried out by passing such products along a conveyor system through one or more sequential chambers or zones of a chamber in which different process conditions are maintained. Different products will require to be processed at different conditions within each chamber or within each zone. Facilities of this type are used for processing a wide variety of products such as metal products, pottery, glass, plastics and food products of all kinds.

In the past products requiring different processing conditions have, of necessity been processed in different batches at different times. The appropriate process conditions must be established in each stage of the processing line or chamber as are needed for a particular product.

Accordingly, it is the general practice to provide such processing lines which are capable of accepting a single type of product at a time. Naturally the quantity of the particular type of product being processed may vary widely, but so long as that one type of product is being processed, no other product requiring different conditions or timing could be passed through the processing facility.

This had the effect of somewhat restricting the flexibility of production. It meant that the processing facilities would have to be operated at conditions which matched either the product for which there was currently the most demand, or alternatively, the product for which the raw materials were currently most readily available or most suitable.

Other types of products would have to be delayed while the one product was being passed through the processing line.

Generally speaking, if it was desired to process more than one type of product simultaneously, then it was considered necessary to erect two separate processing facilities. This of course simply doubled the cost of the initial investment. This increase in investment was not always warranted by market conditions or availability of product and consequently it was not always possible to justify the doubling of the capital investment to achieve the desired flexibility.

An additional disadvantage of the provision of the former type of processing facility was the factor of the physical area, or real estate occupied by the facility. Generally speaking, in order to be operated satisfactorily, the processing chamber was in the form of an elongated oven, which may either be considered as a single continuous chamber, or which may be considered as a series of sequential chambers joined together. A continuous conveyor system such as an overhead conveyor rail ran throughout the chamber, and batches of product were loaded onto the rail at spaced intervals, and moved at a fixed speed.

In the meat processing industry in particular, the products are loaded on product hangers by hand, and the product hangers are then transferred onto the conveyor rails also by manual labour. As a result, there were certain physical limitations on the size of the product hanger and the amount of product that could be hung on any one hanger. This in turn imposed certain dimensional limitations on the interior size of the chamber. Thus the chamber could have no greater width and height dimension than was required to accept the passage of a single manual load of such product. Some attempts to increase the size of the chamber have been proposed such as in U.S. Pat. No. 1,581,519, but have not found wide acceptance.

The result of these various limitations was therefore that in order to achieve a satisfactory processing capacity to meet large scale demands, the processing chambers themselves became of very considerable length. Since the processing chambers were located all on a common level, the end result was that the processing chamber occupied a very considerable amount of space which added considerably to the overall capital cost of the installation. An additional factor in the design and disadvantages of the commonly accepted form of processing facility was that in such processing chambers it is required to provide a highly efficient form of process condition apparatus, such as air circulation, water circulation or the like in each zone, so as to achieve overall uniform conditions at each stage throughout the chamber, in order to provide uniform results.

It was also necessary that such conditions should be capable of being controlled very narrowly, to close tolerances.

To achieve this, in the usual elongated processing chambers, a complex system of pumps, pipes and sprays, or ducts, fans, and temperature and humidity sensors, and temperature and humidity regulators and the like, was provided.

The provision of all these facilities along the full length of a very considerably elongated tunnel-like structure presents considerable engineering problems, and requires the inclusion of a large number of sensors and controls in order to maintain uniformity at the various stages.

Clearly, considerable economies can be achieved by making the interior dimensions of the chambers or ovens larger, and processing the meat products through the larger chambers in larger batches. At the same time, the speed of movement of the conveyor through such chambers would be reduced so that the end result would achieve essentially the same dwell time in the desired processing conditions at each stage throughout the chamber.

It will of course still be necessary to provide for highly efficient process conditioning equipment throughout the interior of each of the zones, but provided suitable attention is paid to this aspect of the design construction, this can now be achieved. For example, there is disclosed in U.S. Pat. Nos. 4,250,917 and 4,310,020 and also in pending U.S. application Ser. No. 188,167, all of which have been assigned to the applicant of this application, various inventive aspects in the design of a batch processing chamber for processing meat products in batches. Process conditioning means are incorporated, providing for effectively uniform processing conditions throughout the entire cross-sectional area of a large chamber, resulting in the uniform processing of very large volumes of product.

The process conditioning means in one or more of the zones in this invention are provided by a water shower treatment system, for showering large volumes of water downwardly through the chamber and means for maintaining a predetermined temperature in the water.

In these batch chambers, a cage-like frame carrying a large volume of product is moved into the chamber, and the product is processed while standing still in the chamber.

By the application of these inventions uniform processing conditions can be maintained throughout the full extent of the cross section of the chamber while very large volumes of product are processed.

The supporting of such large batches of product may be achieved in various ways. For example, product such as weiners may be supported on meat product supports such as are shown in U.S. Pat. Nos. 3,594,858, 3,732,971, 3,792,508, and 3,982,300, all of which have been assigned to the applicant of this application. A skin of sausages from a sausage stuffing machine is loaded onto one of such hangers by hand. Such hangers can be used on a much larger form of support or "cage" in which a larger number, for example, four, six, eight or more such hangers each loaded with weiners may be suspended, and the cage when loaded may then simply be moved into the chamber, for example, on a fork-lift truck.

However, such a facility will only provide for the processing of a single type of meat product at any one time.

As stated, this is found to be unduly restrictive on the flexibility of production.

Various different forms of meat products such as polish sausage and bologna, may be processed in conditions which are virtually identical to the processing of, for example, weiners, but will require to be handled and suspended in different ways from that used in connection with weiners.

Other meat products such as ham and other meats may be processed in different ways for different markets, for example some by smoking, others by cooking, and others by both smoking and cooking.

The processing times or dwell times, as they are known, in the processing chambers will vary depending upon the type of product, notwithstanding that the actual processing conditions, i.e. temperature, humidity and the like are identical. However, when using the usual type of batch chamber it is not normally possible to process such different types of meat products in the same chamber under the same conditions, and provide for different processing times.

For all of these reasons therefore, it is clearly desirable to provide for a continuous processing facility which offers solutions to all of these problems. In particular, such a facility should provide:

1. Capability of simultaneously processing more than one type of product under the same processing conditions, but for different dwell times.

2. A more economical use of space, brought about by a reduction in the length of the facility, and an increase in the interior cross-sectional dimensions, as compared with known continuous processing systems.

3. An improvement in the equipment for maintaining processing conditions, without increasing the complexity or cost of the equipment, and preferably reducing such costs.

4. Capability of supporting different products, in different batches, in the same chamber or zone.

5. Capability of moving batches of product along separate conveyor paths, at different rates, and in a step-wise manner, so that different dwell times can be established in different zones of the chamber, for different batches.

BRIEF SUMMARY OF THE INVENTION

The invention seeks to overcome the foregoing disadvantages by the provision of a processing system comprising, processing chamber means of predetermined width and height, and of predetermined length, and defining at least two sequential processing zones, wherein different processes may be carried out, at least two side by side conveyor means extending through such chamber means, means for supporting separate batches of different products side by side on separate conveyor means in such chamber means, and conveyor operating means for operating one of said conveyor means at a different speed from the other, whereby such separate batches of different products may be moved through the same chambers at different speeds, thereby providing for different dwell times for such different separate batches of such different products within the same zones of such chamber, separate process conditioning means for each of said zones including water shower treatment means in at least one of said zones whereby the process conditions within each said zone may be regulated independently of each other, and, control means for regulating the transport of such separate batches of different products on said separate conveyor means, for regulating the dwell times of such separate batches of different products within the same said zones independently of one another.

More specifically, the invention seeks to provide a processing system having the foregoing advantages in which the system is specifically designed for the processing of meat products, for example by smoking and/or cooking of such products followed by chilling.

More particularly the invention provides process conditioning means in the form of water treatment, in all zones, for heating and/or chilling and the like.

More particularly, the invention seeks to provide a processing system having the foregoing advantages and having step-wise power operated devices whereby batches of product on one conveyor may be moved separately from batches on the other conveyor.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there is illustrated and described a preferred embodiment of the invention.

IN THE DRAWINGS

FIG. 3 is a cross-section along 3—3 of FIG. 1;

DESCRIPTION OF A SPECIFIC EMBODIMENT

Figure 1:
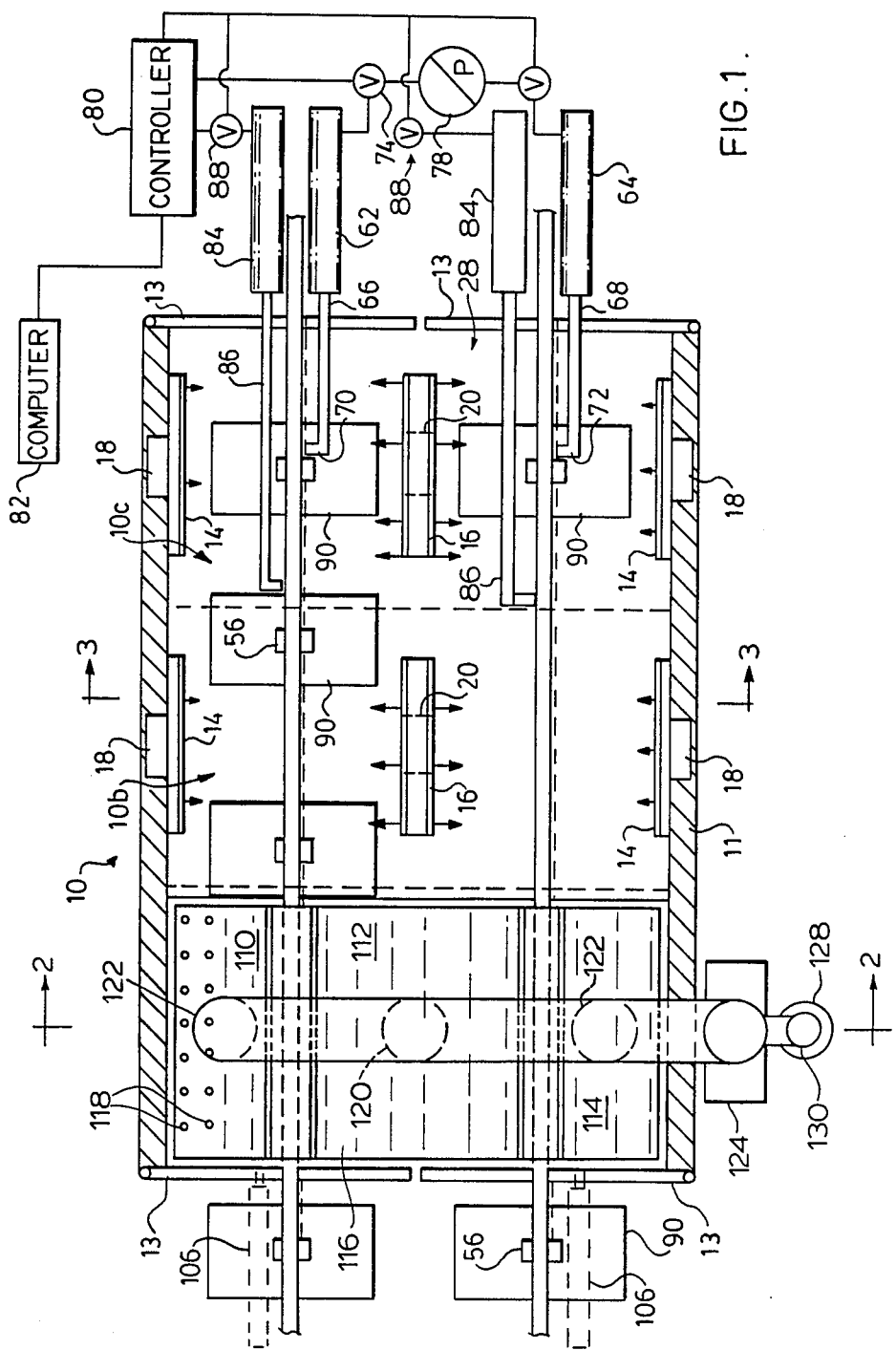
FIG. 1 is a schematic plan view of the processing system according to the invention.

Referring now to FIG. 1, the invention is illustrated in the form of a processing chamber indicated generally as 10, which may be considered as separate zones 10a, 10b and 10c. The illustrated chamber 10 is designed for processing meat products. However, with minor modifications, other products, both fodd and non-food items could be processed, using the inventive principles described.

It will, of course, be understood that the processing chamber 10 in the majority of cases is an essentially elongated tunnel-like device, having side walls 11 and a top wall 12, and open at both ends. Suitable movable doors 13 may be provided for closing off the ends.

The division of the interior of such chamber 10 into zones is in the majority of cases simply a notional division for the sake of explanation and understanding. In many cases there will be no sharp division or partition between individual zones, and the division will be essentially defined by reference to the different temperature, humidity, smoke, etc., conditions prevailing as between two adjacent zones.

However, the invention does not exclude the possibility of movable curtain-like devices or partitions (not shown) dividing individual zones so as to maintain a greater degree of control over the conditions in each zone, and in certain circumstances, it may in fact be desirable to incorporate such partitioning means.

In the example shown, there are three such zones. It will, however, be appreciated that there may be two, three or four more such zones as required for the particular process being carried out. In the typical meat processing application, there will usually be three zones, namely, a smoking zone, a cooking zone and a final chilling zone.

In order to maintain specific process conditions in each zone, process condition means are provided within each zone.

In the processing of meat products such as sausage products, cooked ham and the like, the cooking process can advantageously be carried out by a mass circulation water shower treatment.

Water shower treatment of this kind can produce uniform processing conditions throughout product supported both in upper and in lower regions of the zone simultaneously, and leads to a highly desirable uniform processing condition resulting in uniform product results.

In the past, some forms of high pressure of water spray treatments have been carried out, but have usually resulted in certain disadvantages.

In particular, the operation of high pressure water sprays may not always produce uniform processing conditions from top to bottom of the zone, and also requires in some cases expensive installation and equipment, and regular maintenance.

In the present invention, water circulation is advantageously carried out by a high-mass-flow, low-pressure water shower.

Figure 2:
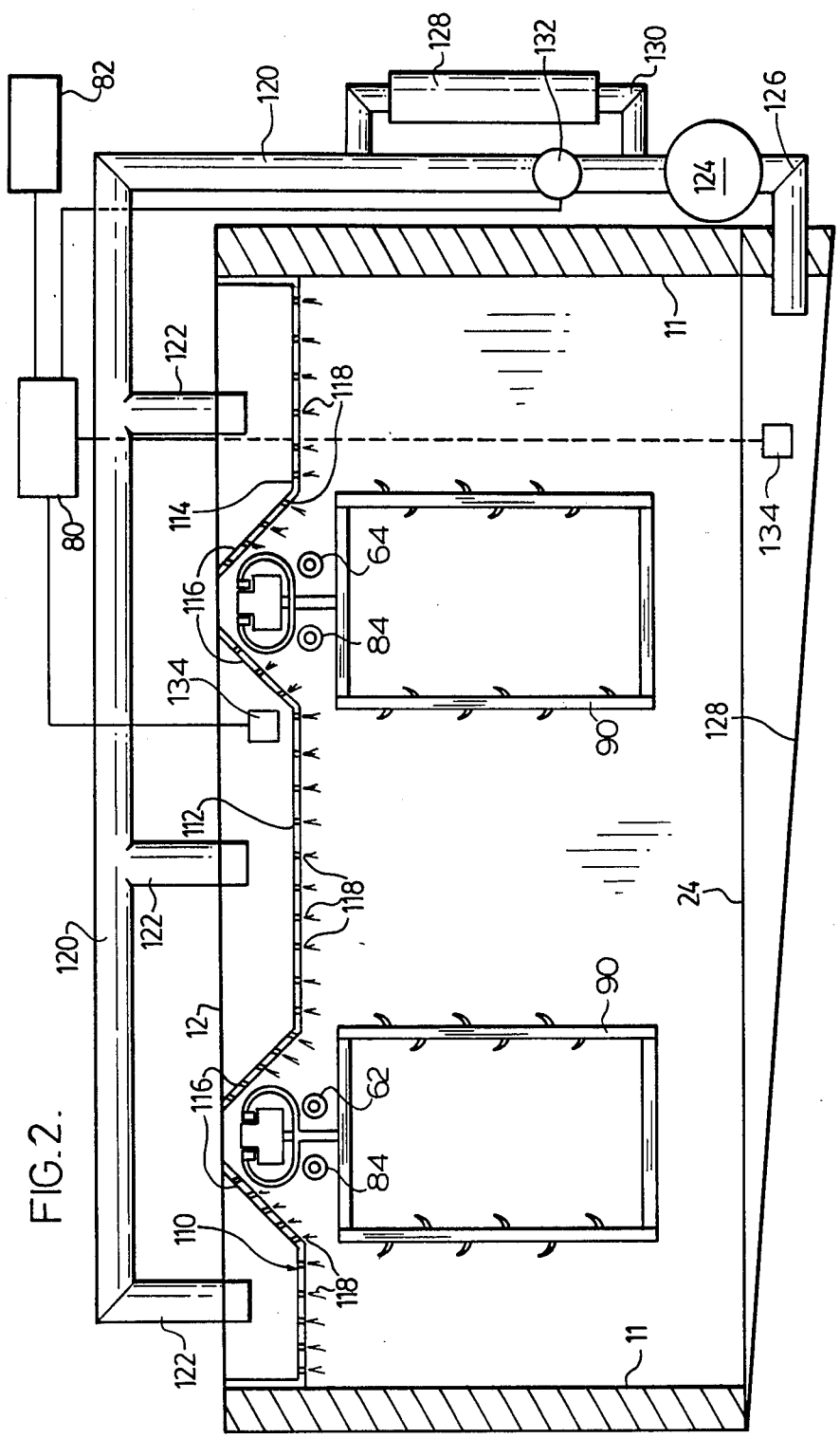
FIG. 2 is a cross-section along 2—2 of FIG. 1.

Such a system is illustrated schematically in FIG. 2.

FIG. 2 represents a cross-section of a typical zone 10 of a typical processing chamber. The choice of which zone will be provided with the water shower treatment or indeed whether two or more such zones would be provided with the water shower treatment, will be dependent upon the type of product to be processed, and the selection of the design engineers.

It will also of course be appreciated that in some cases it may be possible to provide one or more zones both with an air circulating system described below in FIG. 3 as well as a water circulating system such as that shown in FIG. 2, which can be used alternately, thereby giving greater flexibility to the use of the overall installation, in processing a variety of different products.

As shown in FIG. 2, the zone chamber is provided with a system of distribution trays 110, 112, and 114, arranged along the length of the chamber in the zone in which they are mounted, and having angled wall portions 116 alongside the two conveyors.

The trays are perforated or provided with nozzle openings 118, both in the horizontal floor portion, and also in the angled side walls 116.

Water is supplied to the trays by means of a supply pipe 120 and branch pipes 122.

Supply pipe 120 is supplied with water by means of a high volume low pressure pump 124. Pump 124 draws water through return pipe 126, which is connected to well 128.

Well 128 is angled to one side of the chamber as shown, and water falling from the trays, will collect in the well 128, where it will be recirculated by pump 124 back to the trays.

In order to regulate and maintain the temperature of the water in circulation, a heat exchanger 128 is provided in branch pipe 130. A control valve 132 regulates the heat supply to the heat exchanger.

By varying the heat supply to the heat exchanger 128 it is possible to regulate the water temperature in the system.

Suitable water temperature sensors 134 may be provided in the trays, and other water temperature sensors 134 may be provided if desired in the well 128 or some other portion of the system.

In this way, the temperature of the water at various points in the system is checked, and the heat input into the water system can be regulated accordingly.

Very large volume continuous flows of water are maintained in this type of system such that a continuous streaming shower of water is released from the trays, and streams downwardly over the product on the support cages as they pass through the zone and is continuously recirculated back to the trays.

By providing a very high mass flow of water, it is possible to ensure that the temperature of water on the product will vary by no more than one degree from top to bottom.

This ensures that all of the products stored anywhere in any of the cages will be elevated to the same temperature for more or less the same length of time as it passes through the zone. All product will be cooked evenly, and uniformly.

As shown in FIG. 6, water shower treatment trays, and circulating systems, can be provided for all three zones if desired.

As noted above, the process conditions may be established by water shower systems in all zones. In other cases process conditions in one or more of the zones may be provided by an air circulation system. Such a system is illustrated in FIG. 3 and comprises side air flow grilles 14 and central air flow grilles 16. Such grilles 14 and 16 may function as both air delivery or air return grilles, as described below. Such grilles are mounted on plenum boxes or ducts 18, 20 located on the roof of chamber 10 along its central axis, and its sides.

The roof or top of the chamber 10 is represented by the single panel 22, and the floor by the single panel 24. It will, of course, be appreciated that depending upon the design and construction of the chamber such portions of the chamber may be insulated in some way. The interior of the chamber will be preferably formed of stainless steel so as to permit for suitably sanitary processing conditions.

As noted, doors 13 may be provided at the entrance 26 and exit 28 of the chamber 10, in accordance with the designs well-known in the art.

In order to circulate air in each of the "air" zones, air flow systems 30b, 30c, each having a fan 32 and motor 34 are provided. Air flow regulator 36 is connected to fan 32 to receive air flowing in a uniform manner from fan 32, and to regulate the proportionate flow to one side, or the other. Air is withdrawn from the central plenum ducts 20.

The regulator is operated at timed intervals by any suitable power operated means such as electrical power, or compressed air or the like by any suitable means (not shown). In any event, such power operated means is controlled by means of the switch 38.

The regulator may also be a reverser as shown in U.S. Pat. Nos. 4,250,917 and 4,310,020 if desired. Thus by simply operating the switch 38 a greater proportion of air can be directed to one of side wall ducts 18, and across the interior of the chamber, and withdrawn through the central plenum 20. Alternatively, a greater proportion can be supplied through the other side duct where it will again flow across the chamber, in the opposite direction and is then withdrawn through the centre plenum.

In either case, such air flow circulation is essentially continuous, and will be taking place without substantially venting air to atmosphere or inducting fresh air except as is called for by the process conditions.

In order to supply the necessary atmospheric conditions required for processing within any portion of any of the zones, the zones will each be provided with a separate air circulation system 30. Such an air system 30 may incorporate air tempering means such as a smoke generator of any suitable design indicated generally as 40. Alternatively, such smoke generator 40 may be replaced by other tempering means such as by heating coils, or by chilling coils, or by humdity or dehumidity controllers (not shown).

In any event, the air being circulated in any one of the air circulation systems may be subject to treatment both as to temperature and as to its condition and content. Such air treatment systems are in general referred to as "tempering" as being a generic term applicable to all such treatment or conditioning steps as may be required from time to throughout the zones.

In order to control the "tempering" of such air suitable sensors 46, such as sensors for temperature, humidity and the like are provided. They are connected by automatic means to be described below for continuous monitoring.

In order to carry batches of product through the chamber 10, a plurality of side by side conveyor means are provided. In this case two such conveyor means are shown side by side being indicated as 50, and 52 respectively. It will, however, be appreciated that if desired three or conceivably more such conveyor means might be provided in a much larger installation, if production volumes warranted it.

However, there are certain practical limitations as to the number of different conveyors that may usefully be incorporated in the one chamber.

Thus the conditions within any of the zones of the chamber will necessarily be the same throughout that zone. It will thus only be possible to process different types of products, within the same conditions, which are what is known as "compatible" products. This means that the products must be such that although such products are different types, i.e. in some cases weiners on the one hand and bologna sausage on the other hand, they can still be processed under the same ambient conditions and tempering. However they will require different dwell times within the individual zones to produce the desired processing result.

Other forms of meat products such as hams, picnics and the like, and sides of bacon, will not be compatible with such sausage products, in the majority of cases, but could be processed simultaneously side by side in the same chamber at appropriate processing conditions.

Thus, unless a particular processor is faced with a situation where he wishes to process either very large volumes of the same product, on side by side conveyors, or alternatively requires to process three or more different products all of which are "compatible" within the meaning of this definition, it would not be useful to provide three such conveyors going through a chamber having zones wherein the conditions were uniform across each zone.

Each conveyor means 50 and 52 in this embodiment will be seen to comprise rails which are adapted to carry a plurality of movable carriers, known as trollies 54. These may be independent, or may be connectable by means of, for example, a linked chain or the like (not shown). Trollies 54 may be slid onto the rail at one end, and removed at the other after transit through the zones.

Any suitable movement means may be provided which may provide for either continuous movement at a predetermined speed or alternatively may provide for step-wise movement.

In the particular form shown a step-wise movement means is provided in the form of compressed air cylinders 62 and 64, having respective piston rods 66 and 68, provided with hook means 70 and 72. The hook means 70 and 72 are provided with a releasable escapement or tooth device (not shown) such as is well known in the art, for engaging links of the chain (not shown), or suitable portions of one of the trolleys 54. One stroke of cylinder 62 or 64 will cause the trolley engaged by it to advance one step, i.e. the length of such stroke.

It will, however, be appreciated that this is but one form of many different movement devices which may be provided for either continuous or step-wise transmission of product through the chambers.

Cylinders 62 and 64 are separately controllable by means of individual control valves 74 and 76, supplied from typically common compressed air source 78. Valves 74 and 76 are individually controlled by means of a central controller 80.

Controller 80 is also in this embodiment connected to switch 38, controlling the air flow reverser 36.

Preferably, such controller 80 will be connected to the air tempering device 40.

Preferably also, the sensors 46 in each zone of the chamber will also be connected to the controller 80, so that the controller 80 can continuously monitor conditions within the zone and can regulate them accordingly.

The sensors 134, of the water shower treatment system are also connected to controller 80 for monitoring conditions in the system.

It will also be appreciated that in certain cases the physical nature or content of the product being supplied at the input end of the chamber 10 may vary. One common variable in meat products is the fat content of the meat, but there may be other variables in other forms of meat or other products.

The processing conditions may from time to time have to be adjusted accordingly.

Preferably, a product information computer 82 will therefore be provided for supplying information about the product to the controller 80. In this way, the supervisor of the line may vary or adjust the conditions from zone to zone along the length of the line, as the physical content of the product varies.

In some cases, one type of product on one of rails 50 or 52 will not require processing in, for example, the third zone 10a. In this case it must be moved through that zone without stopping.

For this purpose override cylinders 84, each having a rod and hook 86, are provided. They are controlled by valves 88. They are capable of reaching further into the zones and pulling the endmost batch of product through the zone without stopping.

As has been described above, product is processed through the various zones in batches.

Each batch of product will be assembled or supported on a suitable support device, so that that batch can be handled as a single unit.

For the purposes of this application therefore reference is made to a "unit" as being a batch of any particular product being processed, when assembled for transit through the various zones.

In some cases, a unit would consist simply of a single very large product. In other cases, a unit would consist of a large number of individual smaller products.

In the present application, the products being processed are typically food products such as meats and the like, which will normally have been subjected to some previous preparatory steps prior to processing. For example, in the case of sausage products, the preparatory step would involve stuffing the sausage filling into casings.

In the case of products such as luncheon meats, hams, turkey and chicken rolls and the like, the preparatory processing would involve deboning, and possibly some form of pickling in brine or the like, and stuffing into either casings, or moulds.

Meat products would be supported on suitable product-supporting sticks or devices. A cage device indicated generally as 90 carries such sticks of product.

Cages 90 in this embodiment are releasably connected to respective trollies 54. Trollies 54 support the cages 90 from the rail 50 or 52, for passage through the zones.

The trollies may be releasably connected to a continuous conveyor such as a chain (not shown) or the cages may be releasably connected to each other, for movement through the zones.

Where weiners are to be supported, then the aforementioned product supports will be particularly suitable. On the other hand, where other forms of sausage products are to be processed, or where the processing is carried out using hams or picnics or sides of bacon, then other forms of supporting devices will be suitable. One well-known form of suitable product support is the so-called smokehouse stick, which is a wooden or metallic rod, of adequate strength to support a quantity of product which is simply loaded manually and hooked in place on the cage 90. Cage 90 is then moved by any suitable power-operated lifting or hoisting mechanism. Such a mechanism may be specially constructed for the purposes of the invention. Alternatively, it can simply be a fork-lift truck of well-known design.

It will thus be seen that the product may be loaded onto cages 90 of virtually any size desired within reason, so that the cage 90 can be constructed so as to fill the cross-sectional area of the chamber lying beneath the particular conveyor 50 on which it will be supported.

In the example shown, a fairly substantial free space is shown around the cages 90, for the sake of simplicity in explanation. It will, however, be appreciated that in most of such installations the free space will be as far as possible minimized to the extent compatible with providing for free unrestricted circulation of water or air within the chamber.

Clearly, if there is no free space at all between the walls 11 and the cages 90, then access may be to some extent restricted. On the other hand, if excessive free space is provided, then the process facilities will become unnecessarily large, leading to increased capital costs and operating costs without any additional benefit.

Figure 4:
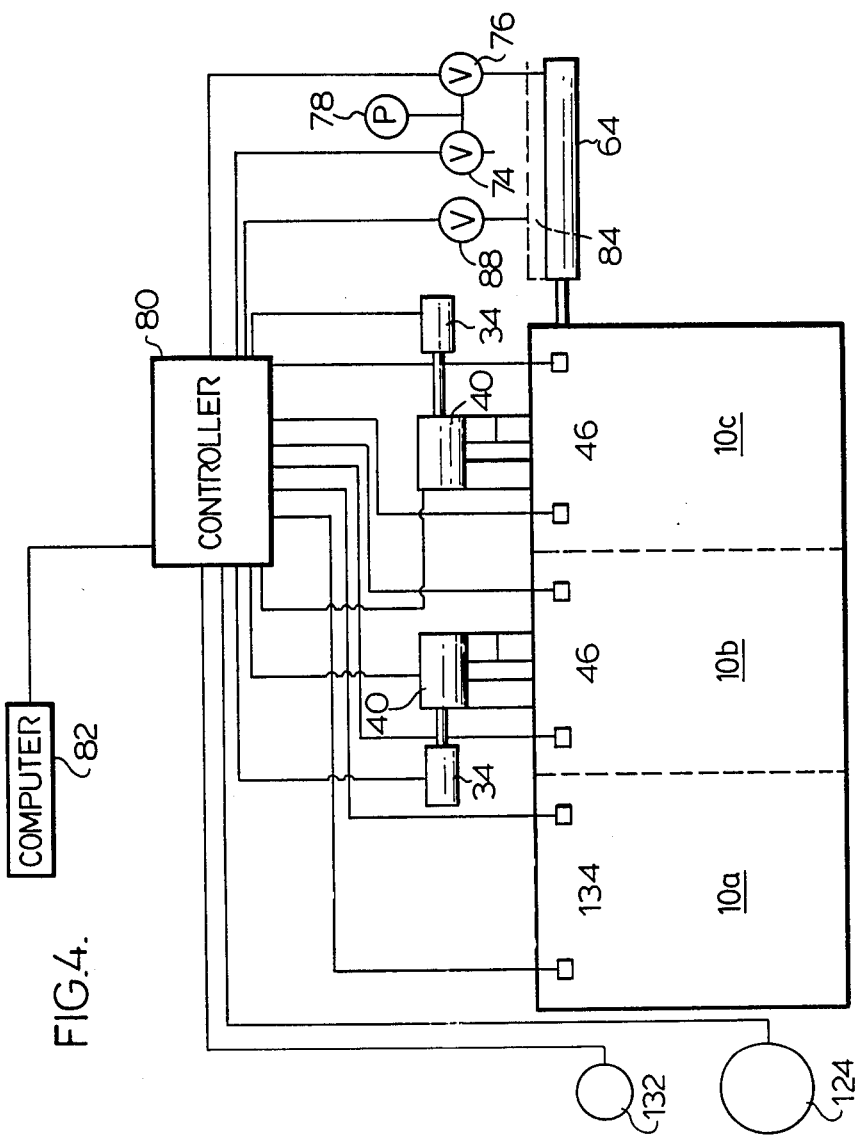
FIG. 4 is a schematic side elevational view of a portion of the conveyor system and power operated transport mechanism, and showing a schematic block circuit diagram of the controller.

The connection of the various controls and operating devices and sensors is best understood with reference to FIG. 4, and the operation of the invention will be self-evident from the illustrations and the description.

Manual operators will load product onto hangers which are then manually placed in position on the cages 90. The cages 90 are then hooked onto rails 50, 52 and then begin movement into the input end of the chamber 10 and thus enter the first zone 10.

If the operator is just starting up operation, then product information will have been input through the computer 82 into the controller 80, so that the necessary conditions are already established within zone 10a at the time the product batch or "unit" first enters.

A batch of a different product may be loaded on another of cages 90, and may be loaded on the other conveyor rail, provided it is "compatible" with the first product.

One product is "compatible" with another product where both products may be processed under the same process conditions, even though different transit and dwell times are required. By means of the computer 82, different transit and dwell times may be provided for the second prdduct on the second conveyor.

The controller 80 will thus control the conditions within the zones, and will also control the separate movement means 62 and 64, so that the transit and dwell times of the cages of product within the zones will vary on the two separate conveyors notwithstanding that the condition within any one zone is uniform throughout.

Figure 5:
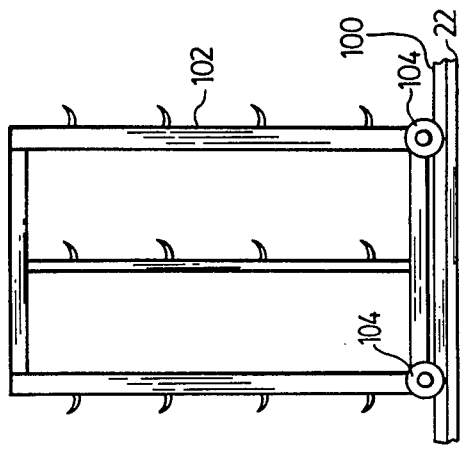
FIG. 5 is a schematic side elevation showing another type of conveyor, and support mechanism; and, FIG. 6 is a schematic top plan view of a processing system with water shower treatments in all the zones.

Another form of conveyor is shown in FIG. 5. In this embodiment rails or guides 100 can be laid in the floor. The cages 102 may have wheels 104. Movement can be controlled by any suitable mechanism which may either push or pull the cages 102 along the rails.

In order to introduce cages of product into the entrance of the chamber, additional product input cylinders 106 may be provided, for pushing loaded cages into the chamber at upstream end.

The override cylinders 84, the downstream end can also be used for extracting fully processed cages.

In addition, it will be appreciated that where doors are provided at the upstream and downstream ends of the ovens, the operation of these doors will also be controlled automatically by the controller, and a suitable door opening and closing mechanism which may also be provided by means of operating cylinders or the likes such as is well known in the art.

While the processing conditions have been described as achieved by a water shower system and by air circulation systems, other systems may be used.

In some cases some form of radiant treatments such as ultraviolet, radiant heat or microwave or the like may establish desirable processor conditions for a particular process. In other cases the circulation of a particular gas mixture may be desirable.

It will thus be seen that by the practice of the invention one product such as weiners can be processed on one side of the chamber, whereas another compatible product such as bologna sausage can be processed on the other side of the chamber, under identical processing conditions. However different dwell times can be provided, to provide for cooking of the two products.

Similarly, where different types of hams are to be processed, they would normally be required to be processed under compatible processing or tempering conditions, but different dwell times might be applicable depending upon the weight of the hams. Thus, small hams or picnics could be processed on one side, and larger hams on the other side.

The processing of bacon, or pork bellies, can also be carried out advantageously in accordance with the invention by processing, for example, smaller products on one side and larger products on the other.

It will thus be seen that a much greater degree of flexibility can be achieved by means of the invention, so that advantage can be taken of the availability of raw materials of different types or at least of different sizes and weights, and the need for storing large quantities of unprocessed raw material prior to processing, can be avoided. Similarly, the delays in marketing product, where orders cannot be shipped, due to the use of processing facilities for some other type of product, for example, is also greatly reduced.

Clearly many other products, both food and non-food products can be advantageously processed in this way in accordance with the invention.

At the same time, the physical amount of real estate required for the installation of the invention is greatly reduced, and the complexity of controls required for controlling the tempering conditions in the various zones is also substantially reduced.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A processing system for the processing of separate batches of meat products in the same processing conditions, such batches being processed for predetermined transit and dwell times, said system comprising:

chamber means defining a plurality of processing zones through which said batches of products are transported;

process conditioning means for each one of said zones, whereby to procure uniform processing conditions within each one of said zones, for all batches of products passing through each one of said zones, said process conditioning means including water shower treatment means in at least one of said zones for establishing a uniform temperature condition in said one of said zones;

first and second separate side by side conveyor means passing through each one of said zones of said chamber means, along which said batches of products are transported side by side;

support means movable on respective first and second conveyor means, for carrying one of said batches of products on said first conveyor means and another of said batches of products on the second said conveyor means;

first step-wise movement means selectively operable at predetermined time intervals for moving one of said support means with one of said batches of products on said first conveyor means operable to cause step-wise movement, and stopping, of said one support means whereby to procure dwells of said one of said batches of products in each one of said zones for predetermined dwell times, for processing under predetermined conditions in each one of said zones;

second step-wise movement means selectively operable at predetermined time intervals for moving another of said support means with another of said batches of products on said second conveyor means, operable to cause step-wise movement, and stopping, of said another of said support means, whereby to procure dwells of said another of said batches of products in each one of said zones for proessing therein under conditions identical to those for said one of said batches of products for predetermined dwell times, and, control means connected to said first and second movement means, and operable to procure separate automatic timed operation thereof whereby said first movement means is operated to move and to stop in a first timed sequence to procure movement and stopping of each of said batches of products on said first conveyor means, and dwelling thereof in each of said zones for a series of predetermined first time limits, and whereby said second movement means is operated to move and stop in timed sequence to procure movement and stopping of each said batch of product on said second conveyor means and dwelling thereof in each of said zones for a series of predetermined second time limits, different from said first time limits.

2. A processing system as claimed in claim 1 including condition sensing means at spaced intervals along said chamber means, and connected to said control means, whereby to regulate the dwell times of said batches of products and the movement of said movement means.

3. A processing system as claimed in claim 1 including door means at the upstream and downstream ends of said chamber means, and automatic opening and closing means associated therewith, said automatic opening and closing means being connected to said control means and operated in time relation thereby.

4. A processing system as claimed in claim 1 including information input means connected to said control means, whereby information relating to said batches of products is stored for regulating the operation of said movement means.

5. A processing system as claimed in claim 1 wherein said movement means comprises a plurality of cylinders, and operating rods extending from said cylinders, and adapted to extend into said chamber means, and having means for engaging said support means and moving the same through said chamber means at timed intervals.

6. A processing system as claimed in claim 1 including air circulation means for at least one of said zones and tempering means for tempering air circulation in said air circulating means, to maintain uniform process conditions in said one of said zones.

7. A processing system as claimed in claim 1 including water shower treatment means in each one of said zones.

8. A processing system as claimed in claim 1 wherein said water shower treatment means comprises water shower header means, water supply conduit means for supplying water to said head means, water collector means for collecting water falling from said chamber and water return means for returning water from said water collector means to said water supply conduit means.

9. A processing system as claimed in claim 8 wherein heat exchanger means is located in a branch pipe means connected to said water return means, and including flow control means for controlling proportionate flow between said water return means and said heat exchanger.

10. A processing system as claimed in claim 1 including third movement means in one of said zones operable to move a said batch of product through said one of said zones in a single step whereby to prevent said batch from dwelling in said one of said zones.

11. A method of processing first and second meat products under identical process conditions, said first and second meat products being suitable for processing under the same conditions, one of said first and second products being processed at different timings than the other of said first and second products, and comprising:

assembling batches of said first product and batches of said second product on separate batch support means;

introducing a batch of said first product into a processing chamber defining at least two sequential zones, along a first conveyor path passing through said zones;

introducing a batch of said second product into the same said processing chamber along a second conveyor path parallel to and spaced from said first conveyor path, and passing the same through each of said zones of said chamber;

in a first one of said zones continuously flowing streams of water at an elevated temperature downwardly through said first one of said zones thereby establishing a first processing condition in said first one of said zones;

establishing a second processing condition in a second one of said zones;

moving said batch of said first product in steps through said zones of said chamber and stopping same for processing at predetermined time intervals, whereby to procure first predetermined dwell times of said batch of said first product in each of said zones, and, moving said batch of second product in steps through each of said zones and stopping same for processing under conditions identical to those processing said batch of said first product at a predetermined second series of timed intervals whereby to procure second dwell times in each of said zones different from said first dwell times of said batch of said first product.

12. A method as claimed in claim 11 including the step of moving said batch of said second product through one of said zones in a single step whereby to prevent said batch of said second product from dwelling in said one of said zones, while a said batch of said first product remains stopped in the same zone.

13. A method of processing products as claimed in claim 11 wherein the step of establishing said processing condition in said second one of said zones comprises circulating air continuously within said second one of said zones, and tempering of air in said second one of said zones to provide said processing condition therein.

14. A method of processing products as claimed in claim 11 wherein the step of establishing a process condition in said first one of said zones comprises the establishing of a continuous shower of water falling through said first one of said zones, collecting said water at a lower portion of said first one of said zones, recirculating same to an upper portion of said first one of said zones for discharge downwardly through said first one of said zones, and continuously regulating the temperature of said water circulating, whereby to provide uniform processing conditions.

15. A method of processing products as claimed in claim 11 including the steps of continuously flowing streams of water in each of said zones.

* * * * *